United States Patent
Raymond

(10) Patent No.: US 7,573,666 B2
(45) Date of Patent: Aug. 11, 2009

(54) OPTIMIZING STORAGE CAPACITY BY SMOOTHLY VARYING TRACK PITCH ACROSS A DISK SURFACE

(75) Inventor: Peter Raymond, Erie, CO (US)

(73) Assignee: ESGW Holdings Limited, Tortola (VG)

( * ) Notice: Subject to any disclaimer, the term of this patent is extended or adjusted under 35 U.S.C. 154(b) by 140 days.

(21) Appl. No.: 11/973,752

(22) Filed: Oct. 10, 2007

(65) Prior Publication Data

US 2009/0097154 A1    Apr. 16, 2009

(51) Int. Cl.
*G11B 5/09* (2006.01)
(52) U.S. Cl. ........................................ 360/48
(58) Field of Classification Search ............... 360/48, 360/75, 77.08, 64, 77.02, 78.04
See application file for complete search history.

(56) References Cited

U.S. PATENT DOCUMENTS

| | | | | |
|---|---|---|---|---|
| 4,163,265 A | * | 7/1979 | van Herk et al. | 360/77.08 |
| 5,245,594 A | * | 9/1993 | Shimizu | 360/64 |
| 5,940,237 A | * | 8/1999 | Takagi | 360/75 |
| 6,005,725 A | | 12/1999 | Emo et al. | |
| 6,256,160 B1 | | 7/2001 | Liikanen et al. | |
| 6,947,248 B2 | | 9/2005 | Allen et al. | |
| 7,145,740 B2 | * | 12/2006 | Zayas et al. | 360/48 |
| 7,154,689 B1 | * | 12/2006 | Shepherd et al. | 360/48 |
| 2004/0136104 A1 | | 7/2004 | Chiao et al. | |
| 2004/0201914 A1 | | 10/2004 | Ikeda et al. | |
| 2005/0041322 A1 | | 2/2005 | Kagami et al. | |
| 2006/0132954 A1 | * | 6/2006 | Wada et al. | 360/48 |

OTHER PUBLICATIONS

U.S. Appl. No. 09/501,711, filed Feb. 10, 2000, "Disk Drive With Variable Track Density", to Emo et al.

* cited by examiner

*Primary Examiner*—Fred Tzeng
(74) *Attorney, Agent, or Firm*—Saile Ackerman LLC; Stephen B. Ackerman

(57) ABSTRACT

A method for operating a fixed media hard disk drive using a plurality of disks on each of which the ratio of servo track pitch to data track pitch is smoothly varied across the surface of the disk as data is being written. The method allows the density of data on each disk to be independently varied, the total data capacity of a disk to be independently varied and introduces a degree of flexibility into the process of testing disk formatting. The method includes the use of a smooth and continuous function having a set of adjustable parameters, by whose definition a relationship between the two pitches is established within the data band. The method can also be applied to disks that are divided into radial zones to take advantage of additional properties of data writing and reading within a hard disk drive.

23 Claims, 3 Drawing Sheets

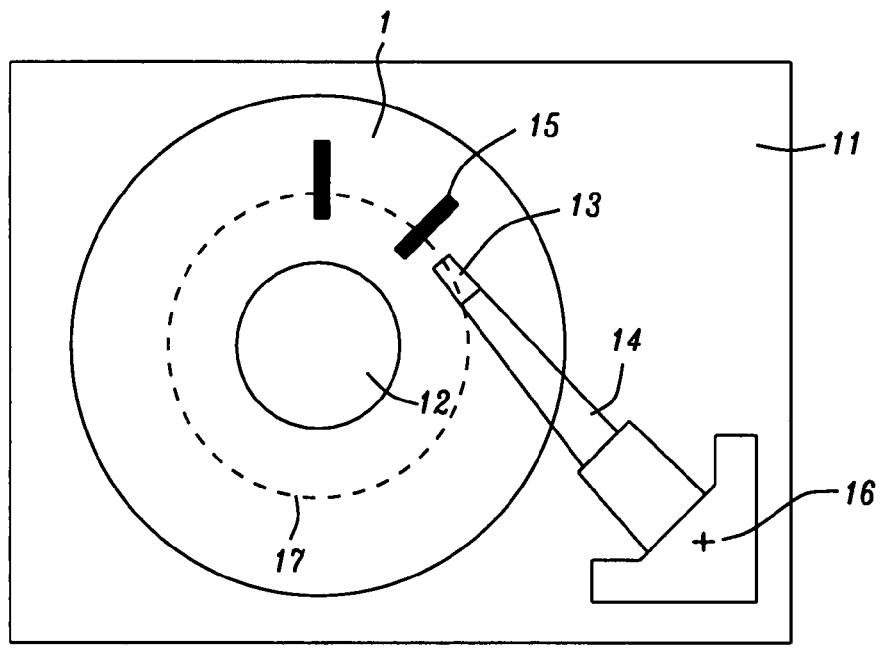
FIG. 1 - Prior Art
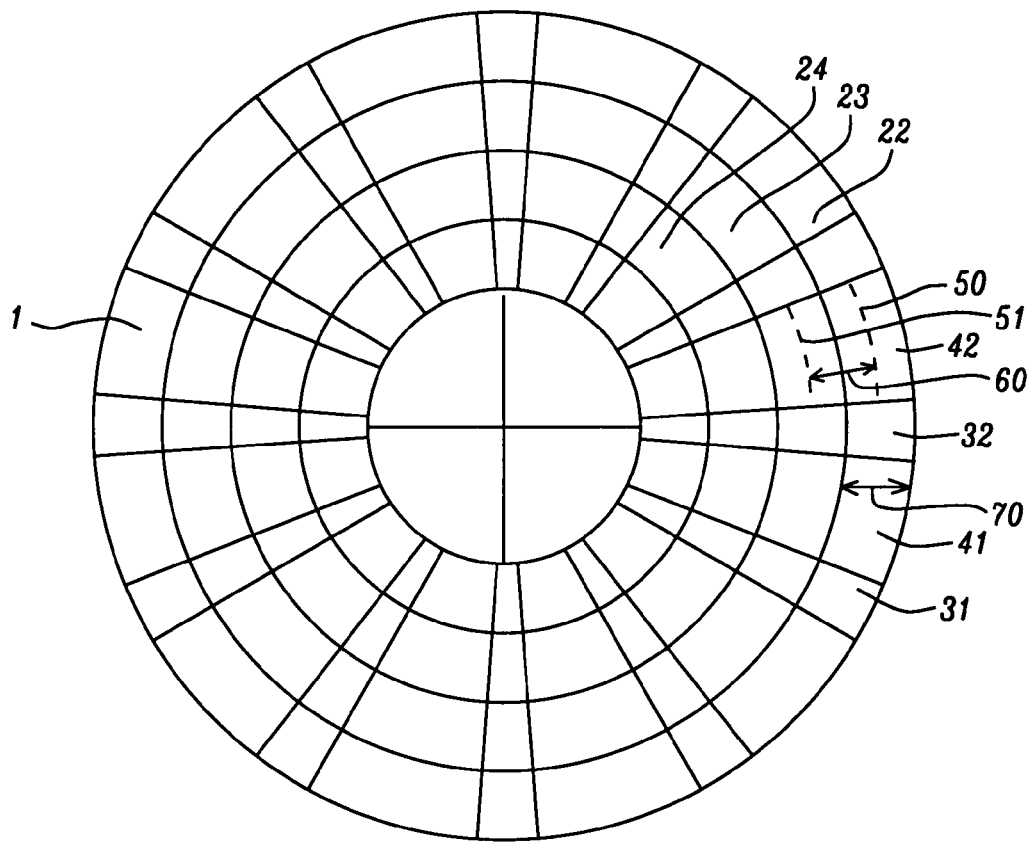
FIG. 2 - Prior Art

| DTN | STL | Serve Track/ data track |
|---|---|---|
| 0 | 0 | |
| 5 | 7.71 | 1.543 |
| 10 | 15.36 | 1.529 |
| 15 | 22.95 | 1.517 |
| 20 | 30.48 | 1.507 |
| 25 | 37.97 | 1.498 |
| 30 | 45.42 | 1.490 |
| 35 | 52.84 | 1.484 |
| 40 | 60.24 | 1.480 |
| 45 | 67.62 | 1.477 |
| 50 | 75.00 | 1.475 |

| DTN | STL | Serve Track/ data track |
|---|---|---|
| 55 | 82.38 | 1.475 |
| 60 | 89.76 | 1.477 |
| 65 | 97.16 | 1.480 |
| 70 | 104.56 | 1.484 |
| 75 | 112.03 | 1.490 |
| 80 | 119.52 | 1.498 |
| 85 | 127.05 | 1.507 |
| 90 | 134.64 | 1.517 |
| 95 | 142.29 | 1.529 |
| 100 | 150 | 1.543 |

OPTIMIZING STORAGE CAPACITY BY SMOOTHLY VARYING TRACK PITCH ACROSS A DISK SURFACE

RELATED PATENT APPLICATIONS

This patent application is related to application Ser. No. 09/501,711, filing date Feb. 10, 2000, Which is herein incorporated by reference in its entirety.

BACKGROUND OF THE INVENTION

1. Field of the Invention

This invention relates to magnetic disk drives and more particularly to the storage of information on a magnetic disk.

2. Description of the Related Art

Hard disk drives (HDD) are magnetic data storage devices on which user created data can be written and read. Referring to prior art FIG. 1 there is shown a schematic drawing of such a HDD (11) on which only a single disk (1) is mounted for clarity or the illustration. Typically such a drive would contain one or more flat disks (1) which rotate at high angular velocity about a central spindle (12) and on which data is encoded by magnetic read/write heads (13) that move above the surface of the disk and are radially positioned by motor driven actuator arms, only one of which is pictured here (14).

The read/write head (13) is mounted on the distal end of the actuator arm. Details of the mounting structure are not shown. By a rotation of the actuator arm about a pivot (16), the head can be made to read and write on any one of a plurality of narrow, concentric annular tracks (an exemplary track being indicated here as a single dashed line (17)) on the rotating disk. Under ideal circumstances the data written by the read/write head forms these narrow annular circular tracks, thinner than 0.3 microns, that are concentric with the rotation axis of the spindle. The dark rectangular segments (15) are schematic representations of radially aligned azimuthal servo data segments shown as intersecting the circular tracks. Although only one track (17) is shown here, these servo data segments would normally extend through all the tracks and they would contain encoded information that enables the head to locate particular tracks and positions on the tracks.

The disks in HDD's are formatted (which may occur prior to or subsequent to mounting) so that during operation the magnetic read/write head can be properly positioned to record user data and then later to locate that data and read it back. As illustrated schematically in FIG. 2, formatting effectively divides each disk surface (1) into concentric numbered annular "servo tracks" (22, 23, 24), which are formed so that the servo mechanism of the HDD (the electro-mechanical mechanism that controls the actuating process) can locate the proper radial position of the track containing the user data. The servo tracks (22, 23, 24) are subdivided azimuthally into alternating substantially wedge-shaped sectors (31, 41) (32, 42), one sector (the data sector) being reserved for user data storage (41), the adjacent sector (31) (the servo sector) containing servo data that is used to locate the user data and maintain the read/write head positioned accurately along the center line of the track (two dashed line segments (50) and (51)). Typically, the servo data within a servo track comprises a servo data field that identifies the track, a servo "burst" that is used to properly align the head with the track (typically the track centerline) and other fields for read/write and system operation. The user data can be overwritten, but the servo data remains fixed. The tracks so formed are characterized by a "width" (70) and a "pitch" (60), the width being the distance between the radial edges of the track and the pitch being essentially the radial distance between centerlines of adjacent tracks. It is to be noted that, for simplicity, the tracks schematically indicated in FIG. 2 show the servo and data portions as having the same common annular width along the entire track. In the present invention, however, these widths will vary, as will be shown in FIG. 4 described below. The region between the outer and inner circumference of the tracks is denoted the data band.

As the disk rotates, the head reads positional information from the servo sectors and the radial position of the head is continually adjusted to place it correctly at the position at which it is to read or write data. If the actual location of the head (as determined by the servo data at its location) does not coincide with its target location (the servo data at the position it is intended to reach) a position error signal (PES) is generated that causes the actuator to reposition the head. As a result of this entire process by which the writing of user data is guided by servo track data that is already radially and azimuthally encoded, the user data is written in radially concentric tracks called data tracks. The radial spacing (pitch) of the data tracks need not be the same as that of the servo tracks, but the ratio of one spacing to the other is generally constant across the disk surface.

Because the head-to-track angle changes as the head moves across the disk (and for other reasons as well) the minimum acceptable track spacing for data tracks varies across the disk. Traditionally, a single constant track spacing is selected that maximizes (within the constraint of a single spacing) the amount of data that can be stored and reliably read back. Alternatively, manufacturers can vary, or "warp" track spacing across the disk in order to store more total data on each disk surface.

At present, data track spacing has been warped by varying the spacing of the servo-tracks across the disk. In this way the consistent relationship between the spacing of the data tracks and the spacing of the servo tracks is maintained. The ratio of the data track to servo track spacing could be 2/3, 1/1, or some other ratio, but it is fixed across the surface of the disk.

Various approaches to defining track spacings can be found in the prior art. Kagami et al., (US Published Patent Application 2005/0041322) describes a disk that is partitioned into radial zones, each having some given radial width. Each zone has the same servo track pitch. In fact, the servo track pitch is constant over the entire disk. However, in each zone, the ratio between the data track pitch and the servo track pitch can be made to change. This is done by defining a numerical coefficient for each zone and then instructing (by a stored "firmware" program) the recording head, when it is in that zone, to locate its data track at a distance from the servo track location that is given by the product of the coefficient and some given constant ratio. Kagami also notes that the disk can also be divided into zones but it is the actual servo track pitch that is made to be different in each zone. Then, the ratio of the data track pitch to servo track pitch is maintained as a constant. Therefore, it is the actual variable servo track pitch in each zone that controls the data track pitch in the zone.

Ikeda et al. (US Published Patent Application 2004/0201914) describes a method for deriving servo track pitch from the read/write element offsets. In this situation the disk is literally customized for the relationship between a particular read and write head.

Chiao et al. (US Published Patent Application 2004/0136104) describes a disk drive with a fixed servo track pitch but a variable data track pitch.

Allen et al. (U.S. Pat. No. 6,947,248) describes a firmware program that can calculate variations in spacing between the read and write elements of a magnetic head and, thereby, change the (fixed) ratio between servo and data track widths from head to head in a multi-disk cartridge.

Liikanen et al. (U.S. Pat. No. 6,256,160) describes a disk in which the servo track pitch and the data track pitch are unequal and, with a particular region of the disk, are related by a constant factor defined as the TPI scale factor.

Emo et al. (U.S. Pat. No. 6,005,725) describes a multi-disk HDD in which the recording zone boundaries on each disk are optimized to the characteristics of the read/write head associated with that disk. In this invention, the data track width is determined by the track width of the read/write head and servo and data tracks have the same width and pitch.

Emo et al., in related application Ser. No. 09/501,711, describe a method of manufacturing a disk drive in which servo track data is written onto a disk, the track width performance of the associated read/write head is measured and the data track pitch is thereby established. As distinguished from U.S. Pat. No. 6,005,725, this invention permits servo track width to be separately specified from data track width, while the data track width is determined from actual track width of the read/write head. The servo track width and pitch is constant across a disk.

The above prior art either defines pitch ratios to optimize a particular head performance or allows pitch ratios to vary within fixed zones. There is, however, another method by which warping can be accomplished. Data track spacing can be warped as data is being written, if the ratio of data tracks to servo tracks is varied on a track-by-track basis. This method is denoted by us as "soft warpage" and it can be considered as a continuous and smooth form of warping the pitch ratios. In this method, the average track spacing and warpage can be varied independently, even after the disk has been formatted. Since optimum data track spacing changes smoothly across the disk, the result of soft warpage could be data tracks written with offsets from the servo tracks that change smoothly from track to track.

To support the offsets between the data tracks and servo tracks an algorithm must be developed and added to the HDD firmware to determine and control the location of each written data track. The inventors believe that this approach offers many advantages relative to approaches taken within the prior art. These advantages include the capability of smoothly and continuously varying the density of written data across the surface of a disk, the capability of varying the total data capacity of each disk among a plurality of disks, and a capability of experimenting with different types of disk formatting during the manufacturing process so as to improve the efficiency of that process.

SUMMARY OF THE INVENTION

In accordance with the discussion of prior art above, it is a first object of this invention to provide a method of independently and smoothly varying data track pitch and servo track pitch on a magnetic disk so as to optimize the ability of read/write heads to accurately read and write user specified data on the surface of said magnetic disk.

It is a second object of this invention to provide a method of varying data track pitch and servo track pitch on a magnetic disk so that the capabilities of different heads and their actuators can be optimized for track reading and writing across a plurality of disks.

It is a third object of the present invention to provide a method by which a HDD can support different data capacities on different disks.

It is a fourth object of the present invention to provide a method by which data track spacing and servo track spacing can be varied independently on a disk on a surface-by-surface basis to maximize production yields.

It is a fifth object of the present invention to provide a method by which different data capacities can be taken into account on a disk-by-disk and surface-by-surface basis.

It is a sixth object of the present invention to provide a method by which smooth variations in data track spacing can be made with no impact on the media formatting portion of the manufacturing process.

It is a seventh object of the present invention to provide a method of independently varying servo track and data track pitches so that the general HDD manufacturing process may be made more efficient by allowing experimental changes in disk formatting to be more easily made.

It is an eighth object of this invention to provide a method of independently varying servo and data track pitches within a disk that has been further subdivided into radial zones.

The objects of this invention will be achieved by the introduction of "soft warpage," which is the continuous, smooth and independent variation of servo track pitch and data track pitch, on an individual track-by-track basis, even after disk formatting has occurred, so as to optimize the spacing of data tracks at all positions on the disk surface.

To implement soft warpage will require the specification of an efficient algorithm to determine and control the location of each data track relative to the positions of associated servo tracks in a manner that produces a smooth variation of data track spacing. A general algorithm that would allow the objects of the invention to be achieved can be expressed as the following nth order polynomial expansion. In terms of the following symbols:

Servo Track Location=STL

Data Track Number=DTN $C_0$, $C_1$, $C_2$, $C_3$ Up to the general $C_n$ being adjustable numerical constants, we express the algorithm as equation (1):

$$STL(DTN)=C_0+C_1*DTN+C_2*DTN^2+\ldots+C_n*DTN^n \qquad \text{Equ. (1):}$$

Using this algorithm (or a specific form of it in what follows), the relationship between data track spacing and servo track spacing can be controlled so as to maximize the information that can be stored on and read from the surface of the rotating media.

The general approach, therefore, can be summarized in the following two steps:

Step 1: Format a blank disk by writing servo tracks. The servo tracks will contain the track numbers and all other normal servo track information. The spacing of the servo tracks can be uniform or variable, either across the entire disk or within defined radial zones on the disk, depending upon the effect to be obtained. The servo tracks can be written using a dedicated servo track writer or using a writer that is part of the HDD.

Step 2. When entering (or reading) user defined data on the formatted disk, calculate the data track location (DTN), seek to that servo track location (STL) and write (or read) the user data. This is accomplished by inputting into equation (1) the number of the data track (DTN) at which it is desired to write or read data, then outputting from the equation the location of that data track measured in terms of servo tracks and fractions of a servo track.

It is understood that the servo track information can be used to place the head at any desired position on the disk and, moreover, that the position of the head at any point on the disk can be ascertained from the servo track information at that position. Thus, for example, the head would be placed at a servo track location of 10043.28 when the head is approximately 28% of the distance between servo track 10043 and 10044.

In an exemplary simplified preferred embodiment, the following particular form of the algorithm, denoted as Equ. (2) below, will be used:

$$STL(DTN) = C_1 * (DTN - C_2)^3 + C_3 * (DTN) + C_4 \qquad \text{Equ. (2):}$$

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 1 shows in schematic form an overhead view of a typical prior art disk drive on which is mounted a disk that can be formatted in accord with the objects of this invention.

FIG. 2 is a schematic overhead view of an unmounted prior art disk showing the location of servo-sectors and data-sectors that are radially and azimuthally located.

DESCRIPTION OF THE PREFERRED EMBODIMENT

The present invention teaches a method for operating a fixed media hard disk drive using disks on which "soft warpage" has been implemented, that is, disks on which the ratio of data track pitch to servo-track pitch is varied continuously across the disk surface. The method includes the creation and use of an algorithm to locate the positions of data tracks, the position of such a track being denoted its "data track number" (DTN), and the position being specified in terms of the locations of servo tracks, denoted the "servo track location" (STL). In this illustrative example, the algorithm is represented by the mathematical formula in Equ. (2) above. In particular, we will limit ourselves to four non-zero adjustable parameters, that are chosen to be:

$C_1 = 0.00001$ $C_2 = 50.0$ $C_3 = 1.475$ $C_4 = 1.25$

For the purposes of this simplified illustrative example of the invention, we assume 150 equally spaced (equal servo track pitch) servo tracks and the algorithm produces a set of data tracks having an approximately 5% variation in minimum to maximum data track spacing with the highest data track densities (more data tracks per servo track) being at the center of the data band. In this particular case the data track numbered: DTN=25, would be written at approximately servo track location STL=37.97 and data track DTN=26 would be written at servo track location STL=39.46. It is to be emphasized that this example is primarily for illustrative purposes and should not be construed as necessarily being appropriate for an optimal production implementation of the method.

Figures 3A, 3B:
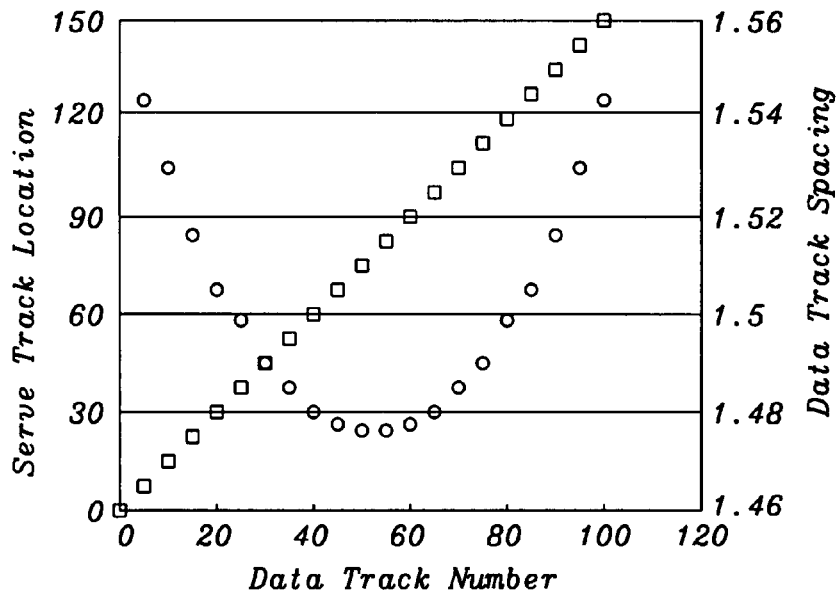
FIG. 3*a* is a graphical indication of the location of data tracks and the spacing between servo tracks and data tracks produced using the algorithm of Equ. (2).
FIG. 3*b* is a table of values used to create the graph of FIG. 3*a*.

Referring to FIG. 3*a*, there is shown a graphical indication of the relationship between data track spacing and servo track location given by the algorithm of Equ. (2). The graph indicates the location at which every fifth data track would be recorded (dark squares). It also shows (dark circles) the average distance per servo track between these data tracks (i.e., number of servo tracks per data track at a data track location). In the middle of this data track band, between data tracks 40 and 65, the distance between data tracks is reduced (see the parabolic graph), so the density of data tracks is correspondingly higher in the middle portion of the data track band.

Referring to FIG. 3*b*, there is shown the actual numerical data used to create the graph of FIG. 3*a*.

This method can be extended to any number of data tracks and to any number of servo tracks and so as to produce any desired smooth variation of track spacings. For example, in an actual 2½ inch drive there would be approximately 100,000 data tracks and if it was desired to obtain a similar 5% variation in the context of the parabolic relationship of Equ. (2) (as illustrated in FIG. 3*a*) as was produced using the exemplary set of 150 data tracks specified above, the algorithm of Equ. (2), with an appropriate change in the constants, would then be applied within the 100,000 data tracks of the actual disk.

In addition, other non-linear relationships between the servo track and data track pitches can be used to implement the algorithm and different equations can be defined within different radially defined zones of data. An algorithm using sinusoidal or exponential functions can be accommodated. However, it is well known that any such non-linear function, within an appropriate range of its variables, can be extremely well represented by a polynomial function, so the use of such an exemplary polynomial function herein, as Equ. (1), is in no way limiting. Thus, for example, if it is desired to divide a disk into a plurality of radial zones, each zone labeled with a label Z and each zone being of given radial extent from an inner to an outer radius, a mathematical polynomial algorithm (for example) of the form of equation (1) can be assigned to each zone. In this case, an appropriate new set of constants, $C_{mZ}$, will be determined for each of the zones, where Z denotes the particular zone, and m labels the particular constant within the polynomial defined for that zone. The use of such zones can be a method of subdividing a disk in accord with the properties of data writing within the hard disk drive, e.g. if data is written at different frequencies in different zones. In a disk drive that contains many disks and where each disk as accessed by its own actuator and transducer, then each disk may be independently subdivided into zones so that the soft warpage discussed above is implemented independently on each disk.

Because of longitudinal and lateral offsets between the read and write elements in a head, data is read with offsets between servo tracks and data tracks that change smoothly across the disk surface as the actuator arm swings in an arc of fixed radius varying the projection of the offsets on the disk surface. With the additional use of soft warping, this head offset would need to be accommodated along with the effects of the warpage.

Figure 4:
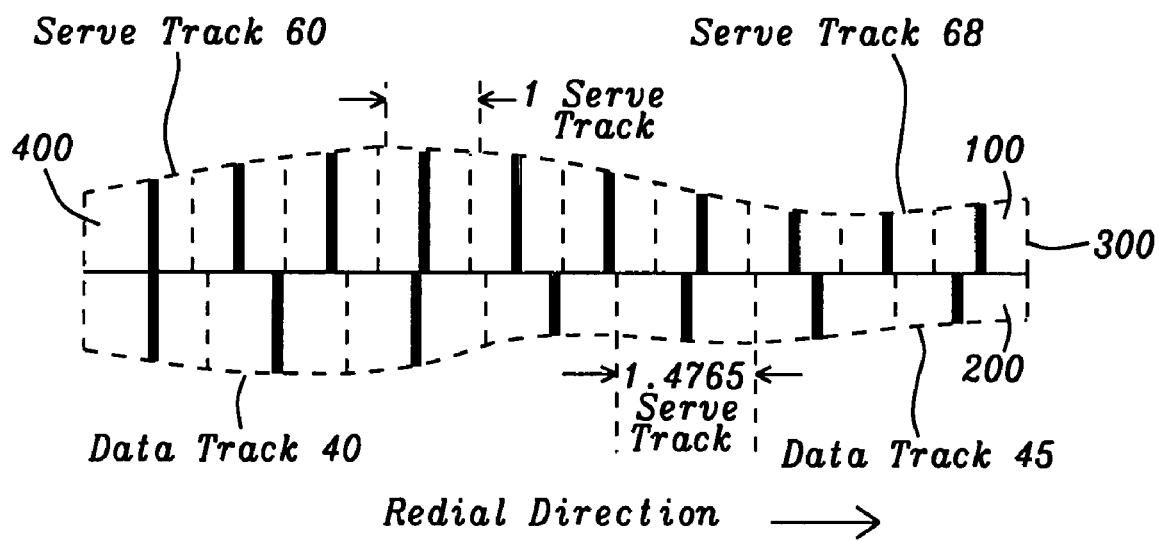
FIG. 4 is a schematic diagram showing a partial section of a disk, indicating a distribution of data tracks and servo tracks formed in accord with the algorithm of Equ. (2) and the data of FIG. 3*b*.

Referring finally to FIG. 4, there is shown schematically a section of a disk on which servo tracks (100) have been formed with a constant width and pitch and the corresponding data tracks (200) have been formed in accord with the soft warpage scheme of FIG. 3*b*. The section, which is outlined arbitratrily in curved dashed lines, is extracted from a radially annular band, between an outer radius (300) and an inner radius (400) and lies within a wedge of narrow azimuthal extent. The set of servo tracks (100), portions of small servo wedges being illustrated here, are numbered radially outwardly from 60 to 68 and are shown as having a constant pitch (distance between adjacent dashed centerlines) and width (distance between adjacent solid lines). The associated data tracks are numbered correspondingly from 40 to 45 and have a pitch and width that is calculated from Equation (2) using constants $C_1$ through $C_4$. Thus, for example, the pitch between data track 40 and data track 41 is 1.4777 servo tracks. The pitch between data track 44 and 45 is 1.4759 servo tracks. Because the numerical results in the table of FIG. 3b that are used to form the graph of FIG. 3a are only specified for every fifth data track, the numbering of tracks 40 to 45 used above required additional calculations, the results of which are shown below (the "pitch" indicating track-to-track spacing between successive DTN values):

| DTN:   | 40     | 41      | 42      | 43      | 44      | 45     |
|--------|--------|---------|---------|---------|---------|--------|
| STL:   | 60.240 | 61.7177 | 63.1949 | 64.6716 | 66.1478 | 67.623 |
| Pitch: | 1.4777 | 1.4772  | 1.4767  | 1.4763  | 1.4759  |        |

As is finally understood by a person skilled in the art, the preferred embodiment of the present invention is illustrative of the present invention rather than limiting of the present invention. Revisions and modifications may be made to methods, constructs, algorithms, materials, structures and dimensions through which the ratio of data track pitch to servo track pitch can be smoothly varied while data is being written on a magnetic disk while still providing such methods, constructs, algorithms, materials, structures and dimensions in accord with the present invention as provided by the appended claims.

What is claimed is:

1. A method for smoothly varying the ratio of servo track pitch to data track pitch on the surface of a magnetic disk while data is being written to said disk, comprising:
    providing a hard disk drive on which can be rotatably mounted at least one fixed media hard disk, said hard disk drive including at least one read/write head distally mounted on a pivotable actuator of fixed length and capable of reading and writing data on said disk;
    formatting said disk with a radial distribution of concentric servo tracks, said servo tracks having a width and a pitch that may vary radially across the surface of said disk and each of said servo tracks having a servo track location, STL;
    writing data within a data track specified by a data track number, DTN; wherein
    STL and DTN are numerically related by a smooth and continuous function and whereby
    there results a radially variable data track pitch per servo track.

2. The method of claim 1 wherein the location of a data track specified by said data track number, DTN, is determined by a method comprising:
    inputting into said smooth and continuous function the number of the data track, DTN, at which it is desired to write or read data, then,
    outputting from said smooth and continuous function the location of that data track measured in terms of a servo track location, STL.

3. The method of claim 1 wherein said read/write head includes read and write elements having longitudinal and lateral offsets, whereby said non-linear equation is further modified to correct variations in servo track width and servo track pitch and data track width and data track pitch produced by changes in projections of said offsets on said disk as said actuator arm describes an arc of fixed radius across said disk surface.

4. The method of claim 1 wherein said smooth and continuous function is provided by a polynomial function of the form: $STL(DTN)=C_0+C_1*DTN+C_2*DTN^2+\ldots+C_n*DTN_n$.

5. The method of claim 1 wherein said polynomial function is of the form $STL(DTN)=C_1*(DTN-C_2)^3+C_3*(DTN)+C_4$, with $C_1$, $C_2$, $C_3$, and $C_4$ being adjustable constants.

6. The method of claim 5 wherein $C_1=0.00001$, $C_2=50.0$, $C_3=1.475$ and $C_4=1.25$.

7. The method of claim 1 wherein the smooth variation of data track pitch within a disk data track band permits a storage of data with variable density, wherein a region of smaller data track pitch per servo track is a region in which a higher density of data can be written.

8. The method of claim 1 wherein the smooth variation of data track pitch within a disk data band permits a variation of total data capacity within said disk.

9. The method of claim 1 wherein the smooth variation of data track pitch within a disk data track band permits a flexibility of disk formatting.

10. A method for smoothly varying the ratio of servo track pitch to data track pitch within radial zones defined on the surface of a magnetic disk while data is being written to said disk, comprising:
    providing a hard disk drive on which can be rotatably mounted at least one fixed media hard disk, said hard disk drive including at least one read/write head distally mounted on a pivotable actuator of fixed length and capable of reading and writing data on said disk;
    defining a plurality of zones on said disk, each of said zones having an inner radius and an outer radius;
    formatting said disk with a radial distribution of concentric servo tracks, said servo tracks having a width and a pitch that may vary radially across the surface of said disk, wherein said variation of width and pitch may be different within different zones and wherein each of said servo tracks has a servo track location, STL;
    writing data within a data track specified by a data track number, DTN; wherein
    STL and DTN are numerically related by a plurality of smooth and continuous functions, each of said functions being associated with a corresponding one of said zones and whereby
    there results a radially variable data track pitch per servo track within each of said zones.

11. The method of claim 10 wherein the location of a data track specified by said data track number, DTN, is plurality of smooth and continuous functions the number of the data track, DTN, at which it is desired to write or read data, then,
    outputting from each of said smooth and continuous functions the location of that data track measured in terms of a servo track location, STL.

12. The method of claim 11 wherein each of said smooth and continuous functions is provided by a polynomial function of the form: $STL(DTN)=C_{0Z}+C_{1Z}*DTN+C_{2Z}*DTN^2+\ldots+Cn_z*DTN^n$, wherein the set of constants $C_{nZ}$ are defined within each radial zone Z.

13. A hard disk drive including a plurality of rotatable hard disks and a plurality of actuator mounted read/write heads, each of said read/write heads capable of writing data on an associated disk, comprising:

the plurality of disks, each disk being formatted with a radial array of concentric and substantially annular servo tracks having a servo track pitch and a servo track width; wherein said servo track pitch and said servo track width may vary radially and wherein each of said servo tracks has a servo track location, denoted STL; and wherein data is written within a plurality of data tracks formed within a data track band, and wherein each of said data tracks has a data track pitch and a data track width and is specified by a data track number DTN; and wherein, said data track pitch and width are smoothly variable radially and wherein STL and DTN are numerically related by a smooth and continuous function, whereby, there is obtained a smoothly variable data track pitch per servo track.

14. The device of claim 13 wherein said servo track width and pitch are specified independently of said data track width and pitch.

15. The device of claim 13 wherein said smooth and continuous function is provided by the polynomial function $STL(DTN) = C_0 + C_1*DTN + C_2*DTN^2 + \ldots + C_n*DTN_n$.

16. The device of claim 13 wherein said polynomial function is of the form $STL(DTN) = C*(DTN-C_2)^3 + C_3*(DTN) + C_4$, with $C_1, C_2, C_3$, and $C_4$ being adjustable constants.

17. The device of claim 13 wherein the variation of said data track pitch within said data track band permits a storage of data with variable density, wherein a region of smaller data track pitch per servo track is a region in which a higher density of data can be written.

18. The device of claim 13 wherein the variation of data track pitch within a disk data band permits a variation of total data capacity within said disk.

19. The device of claim 13 wherein the independent specification of servo track pitch and the smooth variation of data track pitch permits a flexibility in disk formatting.

20. A hard disk drive including a plurality of rotatable hard disks and a plurality of actuator mounted read/write heads, each of said read/write heads capable of writing data on an associated disk, comprising:

the plurality of disks, each disk being divided into a plurality of radially defined zones labeled Z, each of said zones having an inner and outer radius and each disk being formatted with a radial array of concentric and substantially annular servo tracks having a servo track pitch and a servo track width, wherein said servo track pitch and said servo track width may be different within each of said zones; wherein said servo track pitch and said servo track width may vary radially within each of said zones and wherein each of said servo tracks has a servo track location, denoted STL; and wherein data is written within a plurality of data tracks formed within a data track band, and wherein each of said data tracks has a data track pitch and a data track width and is specified by a data track number DTN; and wherein, said data track pitch and width are smoothly variable radially and wherein STL and DTN are numerically related within each of said zones by a smooth and continuous function defined within each of said zones, whereby, there is obtained a smoothly variable data track pitch per servo track.

21. The device of claim 20 wherein, within each of said zones, said servo track width and pitch are specified independently of said data track width and pitch.

22. The device of claim 20 wherein each of said smooth and continuous functions is provided by a polynomial function of the form: $STL(DTN) = C_{0Z} + C_{1Z}*DTN + C_{2Z}*DTN^2 + \ldots + Cn_Z*DTN^n$, wherein a set of constants $C_{nZ\,are}$ defined within each radial zone Z.

23. The device of claim 20 wherein the variation of said data track pitch within each zone within said data track band permits a storage of data with variable density, wherein a region of smaller data track pitch per servo track is a region in which a higher density of data can be written.

* * * * *